United States Patent Office 3,364,033
Patented Jan. 16, 1968

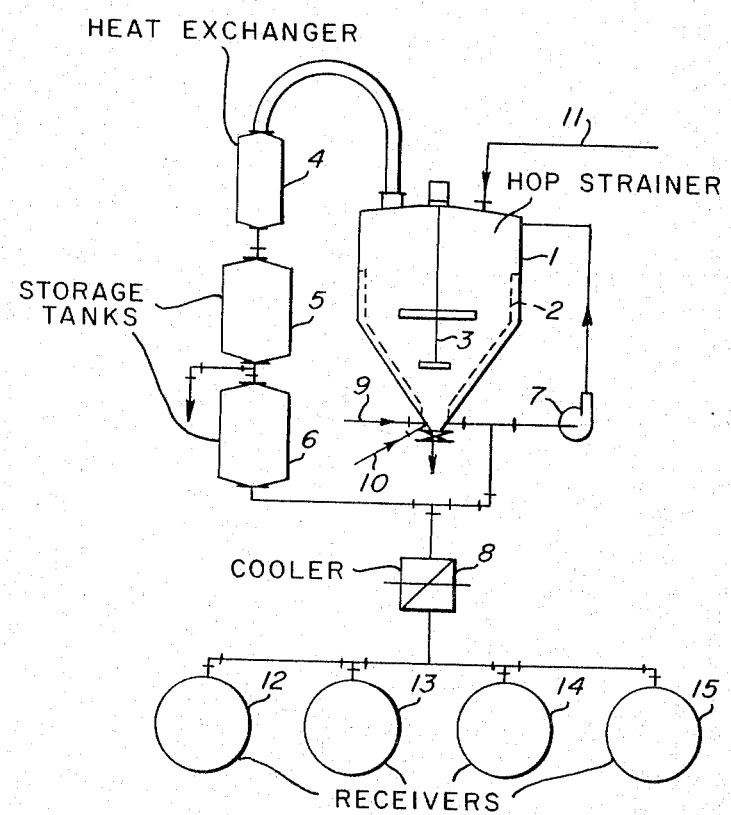

3,364,033
METHOD OF PREPARING HOP EXTRACTS
Lars O. Spetsig, Bromma, Stockholm, Sweden, assignor to Aktiebolaget Stockholms Bryggerier, Stockholm Sweden
Filed Nov. 29, 1963, Ser. No. 326,741
7 Claims. (Cl. 99—50.5)

ABSTRACT OF THE DISCLOSURE

Process for preparing hops extracts by treating hops with warm water to obtain a tannin extract and a hop residue. The residue is treated with boiling water to obtain a first bitter extract and the vapours given off are condensed and collected to produce an aromatic extract. The remaining partially spent hop residue is then oxidized in an aqueous solution at alkaline pH to obtain a second bitter extract.

The tannin extract is added to wort during wort boiling while the two bigger extracts and the aromatic extract are added to the beer during storage.

---

This invention relates to a new and improved method of preparing hop extracts for flavoring beer and other fermented malt beverages, in which a more complete utilisation of the hop constituents is achieved.

In a brewing process, the hop constituents which are of value are the bitter substances, tannins and aromatic substances. The bitters and aromatics are concentrated in the lupulin that covers the bracts of the hop cone.

There are at least thirty or so hop bitter substances of widely varying properties. Three main groups are noticed, namely, humulones, lupulones and hulupones. Humulones, which are relatively insoluble α-acids, are the dominant group comprising 3–8% by weight of the dried hops. Lupulones which are insoluble β-acids comprise 3–5% of the dried hops. Hulupones which are soluble α-acids comprise 2–3% of the dried hops.

The hop tannins are a mixture of a large number of phenol compounds, their concentration varying between 2 and 6% based on the dry weight depending on the provenance of the hops. Tannins must be present in beer during the boiling of the wort to flocculate the proteins of relatively high molecular weight, which would otherwise cause clouding of the finished beer. In addition, a suitable tannin content is required to give the beer an agreeable taste. Beer usually contains 100–250 mg. of tannins per litre.

The aromatic substances of hops comprise at least 45 compounds, most of which are terpene hydrocarbons. The volatile hop oil which contains these aromatic substances constitutes 0.4–1.2% of dried hops. Aromatic substances are valuable for improving the flavour and aroma of beer. In conventional brewing processes, the hops are added during the wort boiling. The relatively insoluble humulones are isomerized during boiling to the readily soluble isohumulones, and these constitute the most important bitter substances. The insoluble lupulones are not dissolved but the readily soluble hulupones are extracted substantially completely. The concentration of dissolved bitter substances rises rapidly but reaches a maximum after about 120 minutes. However, this maximum is substantially lower than would be expected, even allowing for the fact that lupulones remain undissolved in the spent hops. For example, when all humulones have been converted, only about 30–50% of this fraction can be accounted for in the form of isohumulones. This disappearance of humulones and/or isohumulones is probably due chiefly to oxidation by atmospheric oxygen. At the conclusion of mashing the atmosphere above the wort consists of water vapour and air in about equal proportions, and a corresponding amount of oxygen is in solution in the wort. Thus, when wort boiling begins, it takes some time for the temperature to rise high enough for the water to boil so that all the air will be driven off. Loss of bitter principles may also occur by adsorption on solids contained in the wort, chiefly spent hop material.

During the wort boiling, the volatile aromatic principles, particularly myrcene, are distilled off. At the same time, oxidation of the most susceptible substances occurs, polymers being among the oxidation products. When the wort has been boiled under the usual conditions for two hours, there remains only 4–12% of the original hop oil. The aroma possessed by the finished beer after normal wort boiling is therefore on occasion adjudged to be insufficient, and hops are accordingly added in instalments at various times during the wort boiling in order to raise the concentration of aromatics. However, if this is taken to excess, it results in a perfume-like aroma and poor utilisation of the α-acids. The finished beer should contain about 1 mg. of aromatic principles per litre.

It has now been discovered that better utilisation of the valuable substances is achieved if the hops are extracted in the following manner. The hops are first treated with warm water to obtain a tannin extract. This is followed by leaching out the readily soluble bitter substances (among them hulupones) and isomerizing the relatively insoluble humulones to readily soluble isohumulones by boiling the hops in an aqueous solution of neutral pH to yield a first bitter extract. Rapid boiling at this stage is preferred to counteract oxidation. The vapour boiling off is condensed to form an aromatic extract. Since the most valuable aromatic substances are the last to be distilled off, however, fractionation may be employed to collect two or more separate fractions. Finally, the partially spent hops are oxidised by customary means, e.g. see Swedish Patent No. 150,997, to form a second bitter extract.

The process is more clearly illustrated with reference to FIGURE 1 which is a schematic representation of an apparatus adapted to carry out the process of the invention. The hops are placed in hop strainer 1, which is a conical tank having a perforated plate 2 and a stirrer 3. Water at a temperature of 30–60° C. is passed in through pipe 11 and the hops extracted for 0.2–1 hour. The lowest practical temperature is used in order to avoid dissolution and oxidation of the bitter principles. The aqueous extract thus formed is then drawn off by pump 7 and passed through cooler 8 into receiver 12. This constitutes the tannin extract.

All air is then displaced from the tank by steam which enters through pipe 9. Boiling air-free water is added through pipe 11 after which the pH is adjusted to 6.5–8 by the addition of sodium hydroxide solution through pipe 10.

If necessary, a buffer, e.g. sodium phosphate, may be added. The mixture is then boiled for 1 to 2 hours during which time the readily soluble bitter principles are dissolved out and the humulones are isomerized to soluble isohumulones. The resulting solution, which constitutes the first bitter extract is drained off by means of pump 7. The hops are then sparged with boiling water which is added to the above extract which is then cooled to avoid oxidation in the course of transferring to receiver 13.

The vapour which is distilled off during boiling is condensed in heat exchanger 4 and passed into storage tank 5. This vapour comprises a hop oil extract which condenses and separates into an oil layer and an aqueous layer. The aqueous layer is returned to the hop strainer since it contains small quantities of valuable aromatic substances in solution. The oil distillate first formed consists of some aromatic substances which in conventional wort boiling are lost by evaporation. These first runnings are therefore separated. During the later stages of boiling a layer of less volatile aromatic substances is formed. These are collected as the aromatic extract and passed into receiver 14. Minor amounts of aromatic substances remain in the aqueous solution and will in due course form part of the second bitter extract. Since the aromatic extract is particularly susceptible to oxidation, it is carefully cooled by means of cooler 8. The partially spent hop material remaining in the tank is treated by adding water through pipe 11, at a temperature of 70 to 80° and adjusting the pH to 9–11 by the addition of sodium hydroxide solution through pipe 10, after which air is blown through pipe 9 for half an hour. This yields a solution of oxidized and readily soluble bitter substances, which together with the sparging water, constitutes the second bitter extract which is drawn off by means of pump 7 through cooler 8 into receiver 15.

The process of the invention may be carried out with lupulin instead of hops, the advantage of this being that considerably less water is required.

The various extracts produced in the process may be utilised in the following manner. The tannin extract collected in receiver 12 is introduced into the brewing process during the wort boiling. The two bitter extracts collected in receivers 13 and 15 are united after cooling and are added to the beer together with a suitable proportion of the aromatic extract collected in receiver 14 as late as possible in the brewing process, preferably in the storage tanks. Extracts may be kept for a short period, the duration being chiefly determined by the stability of the aromatic substances against oxidation.

The advantages obtained by using the process of the invention are that isomerisation of the humulones in an oxygen-free atmosphere for an optimum period of time with pre-boiled water improves the yield of bitter substances with a consequent saving in the use of hops. Similarly, by the subsequent oxidative treatment of the partially spent hop material, the utilisation is still further increased.

The collection of an aromatic extract makes possible to produce a beer of strong flavour if desired without a lowered hop economy.

In addition, if the hops are added during wort boiling, the insoluble substances may interfere with the process. In this invention, however, since the hops are extracted first, the insoluble bitter substances may only be found in the beer strainer and by suitable adjustment of the pH value of the combined bitter extracts, these insoluble bitter substances can be separated out before the addition of the soluble bitter substances to the beer takes place.

The isolation of the hop treatment gives the whole brewing process greater flexibility. It makes continuous wort boiling more feasible since the boiling can be performed in the most favourable manner from the protein point of view, namely with the hop tannins present but without having to consider the susceptibilities of the hops.

The invention also affords scope for obtaining extracts that will stand storage by the solvent extraction of the aqueous solutions.

Material changes in flavour and aroma of the beer cannot occur by using the process of the invention since no new reactions are utilized and no new type of substances are added.

The invention is illustrated by the following examples:

*Example 1*

2 kg. of hops containing 17% of bitter principles and 4% of tannins were treated with 100 litres of aqueous solution at a temperature of 40° C. and a pH of 4 for half an hour, with accompanying agitation. The solution was drained off and the hops were sparged with 100 litres of water. The solution and sparging water which together form the tannin extract were mixed and transferred to the fermented wort. 100 litres of boiling water was then added to the hops and a solution of sodium hydroxide in water was stirred in until the pH had risen to 7.5. The reaction mixture was boiled with accompanying agitation for 1½ hours. During the conversion of the humulones to isohumulones, the pH fell so that the sodium hydroxide solution was added in successive doses to maintain the pH. The solution of bitter principles was strained off and the partially spent hop material was sparged with 100 litres of boiling water. The solution and the sparging water were mixed and cooled and added to the fermented wort. The partially spent hop material was stirred in a 100 litres of water at 80° C. to form a suspension to which sodium hydroxide solution was added to bring the pH up to 10.5. Air was bubbled through the mixture for half an hour with accompanying agitation, the temperature and pH being kept constant throughout by supplying heat and sodium hydroxide solution. The solution of bitter principles was strained off and the partially spent hop material was sparged with 100 litres of hot water. The solution and the sparging water were cooled and added to the fermented wort. The finished beer contained 80 mg. of bitter principles per litre as against 76 mg. per litre in a control brew which was flavoured by boiling the same quantity of wort with 5.2 kg. of hops according to the customary wort-boiling procedure, as against the quantity of hops used in the experiment, namely 2 kg.

*Example 2*

2 kg. of hops containing 17% of bitter principles were treated with accompanying agitation with 100 litres of aqueous solution at a temperature of 45° C. and a pH of 4.7 for approximately 20 minutes. The solution was drained off, and the hops sparged with 100 litres of water and drained, the solution and sparging water were then transferred to the fermented wort. 100 litres of boiling water was added to the hops and a solution of sodium hydroxide in water was stirred in until the pH had risen to 7.1. The reaction mixture was boiled with accompanying agitation for one hour. The mixture of water vapour and aromatic substances that distilled off during boiling was condensed in a cooler. The condensate obtained during the first 45 minutes was discarded, while that obtained during the last 15 minutes was retained. During the conversion of the humulone the pH fell, so that sodium hydroxide solution was added in successive doses to compensate for the fall in pH. The solution of bitter principles was strained off and the partially spent hop material was sparged with 100 litres of boiling water. The solution and the sparging water were cooled and added, together with the retained distillate, to the fermented wort. The finished beer contained 64 mg. of bitter principles per litre as against 67 mg. per litre in a control brew in which flavouring was effected by boiling the same quantity of wort with 4.3 kg. of hops by the customary wort-boiling procedure, as against the use of 2 kg. of hops in this experiment.

*Example 3*

10 litres of boiling water was added to lupulin from 2 kg. of hops containing 17% of bitter principles, and a solution of sodium hydroxide in water was added with accompanying agitation until the pH had risen to 7.3. The reaction mixture was boiled with accompanying agitation for 1½ hours. During the conversion of the humulon the pH fell, so that sodium hydroxide solution was added in successive doses to compensate for the fall in pH. The solution of tannins and bitter principles was removed by centrifuging, then cooled and added to the tannin-treated wort before fermentation. The finished beer contained 86 mg. of bitter principles per litre as against 78 mg. per litre in beer flavoured by boiling the same quantity of beer with 5.7 kg. of hops by the customary wort-boiling procedure, i.e. a quantity substantially gerater than the 2 kg. used in the experiment.

Although specific embodiments of the invention, for example, weight, pH, temperature, have been disclosed

What I claim as my invention is:

1. Process for preparing hop extracts for flavouring fermented malt beverages comprising the steps of treating hops with water to obtain a tannin extract; treating the hop residue so formed with boiling water to obtain a first bitter extract; collecting and condensing the vapours given off during said boiling to obtain an aromatic extract; and treating the partially spent hop material by oxidation in an aqueous solution at alkaline pH to obtain a second bitter extract.

2. Process according to claim 1 characterized in that the tannin extraction is effected with water at a temperature of 30–60° C. for 0.2–1 hour.

3. Process according to claim 1 characterized in that the vapours given off during the earlier stages of said boiling are discarded and the vapours given off during the later stages of said boiling are condensed to form the aromatic extract.

4. Process according to claim 1 characterized in that the first bitter extract is obtained by treating the hop residue with boiling air-free water for 1 to 2 hours at a pH of 6.5–8 maintained by the addition of sodium hydroxide solution.

5. Process according to claim 4 characterized in that a buffering agent is added prior to the termination of said boiling.

6. Process according to claim 1 characterized in that the second bitter extract is obtained by treating the partially spent hop material with water at a temperature of 70–80° C., to obtain an aqueous solution, maintaining said aqueous solution at a pH of 9–11 by the addition of sodium hydroxide solution, and blowing air through said aqueous solution for a period of 20–40 minutes.

7. Process according to claim 1 characterized in that the tannin extract is added at the wort boiling stage of a process for brewing malt beverages and the first and second bitter extracts and aromatic extract are added to the fermented malt beverage during storage.

References Cited
UNITED STATES PATENTS

| | | | |
|---|---|---|---|
| 1,800,632 | 4/1931 | Horst | 99—50.5 |
| 2,345,773 | 4/1944 | Schorr | 99—50.5 |
| 2,652,333 | 9/1953 | Nilsson et al. | 99—50.5 |
| 2,816,032 | 12/1957 | Heyer | 99—50.5 |
| 3,155,522 | 11/1964 | Hildebrand et al. | 99—50.5 |

MAURICE W. GREENSTEIN, *Primary Examiner.*